United States Patent Office 3,505,225
Patented Apr. 7, 1970

3,505,225
DERIVATIVES OF DIPHENYLAMINE AND THE PHENYLNAPHTHYLAMINES AS ANTIOXIDANTS AND AS SYNERGISTS WITH DIALKYL 3,3′-THIODIPROPIONATES
Edward L. Wheeler, Woodbury, Conn., assignor to Uniroyal Inc., New York, N.Y., a corporation of New York
No Drawing. Filed Apr. 7, 1966, Ser. No. 540,817
Int. Cl. C10m 1/38, 1/32
U.S. Cl. 252—33.6       2 Claims

ABSTRACT OF THE DISCLOSURE

Derivatives of diphenylamine or phenylnaphthylamine of the types

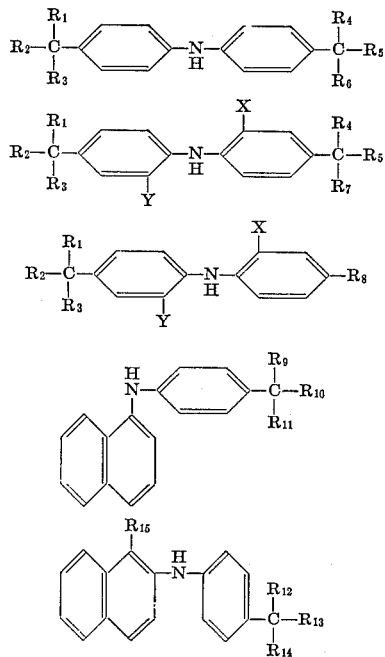

where $R_1$, $R_9$ and $R_{12}$ are phenyl or p-tolyl groups and the remaining R's, X and Y may be alkyl or various other substituents, are useful antioxidants for lubricating oils or for various polymeric substrates (e.g., polypropylene) especially in combination with a dialkyl thiodipropionate. Typical antioxidants are: 4,4′-bis(alpha,alpha-dimethylbenzyl)diphenylamine made by reacting alpha-methylstyrene with diphenylamine; 4,4′-bis(alpha-methylbenzhydryl)diphenylamine made by reacting 1,1-diphenylethylene with diphenylamine; and N-(4-alpha,alpha-dimethylbenzylphenyl) - 1-(alpha,alpha-dimethylbenzyl)-2-naphthylamine made by reacting alpha-methylstyrene with N-phenyl-2-naphthylamine.

This invention relates to new antioxidants which are derivatives of diphenylamine and the phenylnaphthylamines and their use either alone, in combination with each other, or in combination with dialkyl 3,3′-thiodipropionates, for the protection of organic materials having relatively low olefinic unsaturation, which are subject to oxidative deterioration, particularly at elevated temperatures. Examples of materials which are subject to oxidative deterioration at elevated temperatures either in the course of their processing or fulfilling their prescribed function and which are protected by the compounds of the invention are alpha-olefin polymers, polyamides, polyesters, polyacetals, acrylonitrile-butadiene-styrene thermoplastics, and lubricants of the petroleum oil type or of the synthetic type.

The compounds useful in the invention are represented by the following formulae:

(I) 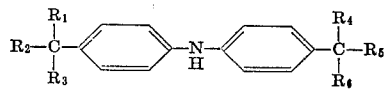

where $R_1$ is a phenyl or p-tolyl radical.
$R_2$ and $R_3$ are selected from methyl, phenyl and p-tolyl radicals.
$R_4$ is selected from methyl, phenyl, p-tolyl and neopentyl radicals.
$R_5$ is selected from methyl, phenyl, p-tolyl and 2-phenylisobutyl radicals.
$R_6$ is a methyl radical.

(The compounds wherein $R_1$ and $R_4$ are phenyl, $R_2$ and $R_5$ are methyl or phenyl, and $R_3$ and $R_6$ are methyl, are claimed as new chemicals in copending application Ser. No. 540,830 of Norman K. Sundholm, filed of even date herewith. All other chemicals of the foregoing formula and of the following formulae are believed to be new chemicals and are herein claimed as such.)

(II) 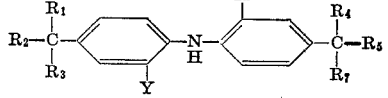

where $R_1$ through $R_5$ are selected from the radicals shown in Formula I and $R_7$ is selected from methyl, phenyl, or p-tolyl radicals.
X is selected from a group consisting of the radicals methyl, ethyl, a sec-alkyl containing from three to ten carbon atoms, alpha,alpha-dimethylbenzyl, alpha-methylbenzyl, chlorine, bromine, carboxyl, and metal salts of the carboxylic acids where the metal is zinc, cadmium, nickel, lead, tin, magnesium, or copper.
Y is selected from a group consisting of the radicals hydrogen, methyl, ethyl, a sec-alkyl containing from three to ten carbon atoms, chlorine, and bromine.

(III) 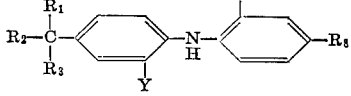

where $R_1$ is a phenyl or p-tolyl radical.
$R_2$ and $R_3$ are selected from methyl, phenyl and p-tolyl radicals.
$R_3$ is selected from a group consisting of the radicals hydrogen, a primary, secondary and tertiary alkyl containing from one to ten carbon atoms, and alkoxyl containing from one to ten carbon atoms which may be straight chain or branched.
X and Y are selected from a group consisting of the radicals hydrogen, methyl, ethyl, sec-alkyl containing from three to ten carbon atoms, chlorine and bromine.

(IV) 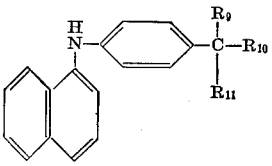

where $R_9$ is a phenyl or p-tolyl radical.
$R_{10}$ is selected from methyl, phenyl, p-tolyl and 2-phenylisobutyl radicals.
$R_{11}$ is selected from methyl, phenyl and p-tolyl radicals.

(V) 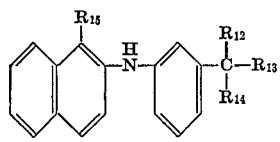

where $R_{12}$ is a phenyl or p-tolyl radical.
$R_{13}$ is selected from methyl, phenyl and p-tolyl radicals.
$R_{14}$ is selected from methyl, phenyl, p-tolyl and 2-phenylisobutyl radicals.
$R_{15}$ is selected from a group consisting of the radicals hydrogen alpha,alpha-dimethylbenzyl, alpha-methylbenzhydryl, triphenylmethyl and alpha,alpha,p-trimethylbenzyl.

Typical chemicals useful in the invention are as follows:

TYPE I

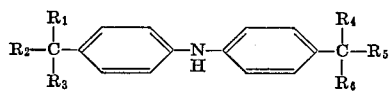

|     | $R_1$   | $R_2$  | $R_3$   | $R_4$      | $R_5$  | $R_6$  |
|-----|---------|--------|---------|------------|--------|--------|
| (a) | Phenyl  | Methyl | Methyl  | Phenyl     | Methyl | Methyl |
| (b) | do      | do     | Phenyl  | do         | Phenyl | Do.    |
| (c) | do      | do     | Phenyl  | Neopentyl  | Methyl | Do.    |
| (d) | p-Tolyl | Methyl | Methyl  | p-Tolyl    | do     | Do.    |

(Chemicals I(a) and I(b), namely, 4.4'-bis(alpha,alpha-dimethylbenzyl)diphenylamine and 4,4'-bis(alpha-methylbenzhydryl)diphenylamine, are claimed as new chemicals in the aforementioned application Ser. No. 540,830; all of the other chemicals listed herein are claimed as new chemicals in the present application).

TYPE II

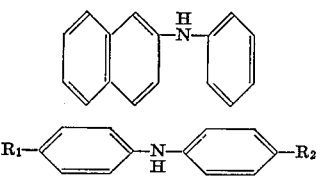

| | $R_1$ | $R_2$ | $R_3$ | $R_4$ | $R_5$ | $R_7$ | X | Y |
|---|---|---|---|---|---|---|---|---|
| (1) | Phenyl | Methyl | Methyl | Phenyl | Methyl | Methyl | Alpha, alpha-dimethyl-benzyl | Hydrogen. |
| (2) | do | do | do | do | do | do | Bromo | Bromo. |
| (3) | do | do | do | do | do | do | Carboxyl | Hydrogen. |
| (4) | do | do | do | do | do | do | Nickel carboxylate | Do. |
| (5) | do | do | do | do | do | do | 2-butyl | Do. |
| (6) | do | do | do | do | do | do | 2-octyl | Do. |
| (7) | do | Phenyl | Phenyl | do | Phenyl | Phenyl | 2-hexyl | Do. |

TYPE III

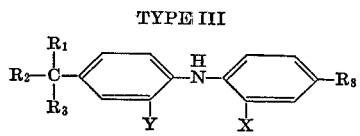

|     | $R_1$  | $R_2$  | $R_3$  | $R_8$      | X         | Y       |
|-----|--------|--------|--------|------------|-----------|---------|
| (1) | Phenyl | Methyl | Methyl | Isopropoxy | Hydrogen  | Hydrogen |
| (2) | do     | do     | do     | Hydrogen   | 2-octyl   | Do.     |
| (3) | do     | Phenyl | Phenyl | do         | 2-hexyl   | Do.     |

TYPE IV

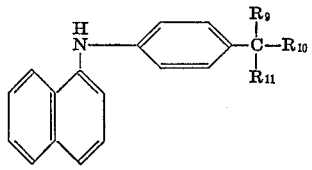

$R_9$ is phenyl and $R_{10}$ and $R_{11}$ are methyl.

TYPE V

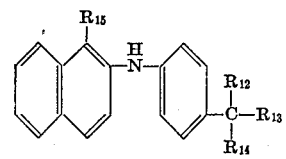

|     | $R_{12}$ | $R_{13}$ | $R_{14}$ | $R_{15}$ |
|-----|----------|----------|----------|----------|
| (1) | Phenyl   | Methyl   | Methyl   | Hydrogen. |
| (2) | do       | do       | do       | Alpha,alpha-dimethyl-benzyl. |

It has previously been known to employ 4,4'-bis(1,1,3,3-tetramethylbutyl)diphenylamine as an antioxidant for rubber.

U.S. Patent No. 2,943,112 to Ivan C. Popoff et al. describes the use of alpha-methylstyrene to reduce the amount of unreacted diphenylamine or monalkylated diphenylamine present after alkylating the diphenylamine with a $C_5$–$C_{12}$ olefin.

U.S. Patent No. 2,543,329 to C. S. Myers describes the stabilization of polyethylene with diphenylamine.

U.S. Patent No. 2,519,755 to M. F. Gribbins describes the use of a dialkyl 3,3'-thiodipropionate as a stabilizer for polyethylene.

U.S. Patent No. 3,072,603 to C. E. Tholstrup describes the stabilization of poly-alpha-olefins by use of a stabilizer combination consisting of a diester of 3,3'-thiodipropionic acid and a nitrogen-containing compound of the following types:

where $R_1$ and $R_2$ are selected from the group consisting of hydrogen atoms and alkyl radicals having 1 to 12 carbon atoms.

The synthesis of 4-trityldiphenylamine and 4,4'-ditrityldiphenylamine has been reported by D. Craig, J. Am. Chem. Soc. 71, 2250 (1949); G. Baum, W. L. Lehn, and C. Tamborski, J. Org. Chem. 29, 1264 (1964) and also disclosed as a rubber antioxidant by A. W. Campbell, U.S. Patent No. 1,902,115 (Mar. 21, 1933) and U.S. Patent No. 1,950,079 (Mar. 6, 1934) although the described structure was incorrect.

As indicated previously, the present derivatives of diphenylamine and phenylnaphthylamines are effective antioxidants for materials of low unsaturation. The materials of low unsaturation include essentially saturated polymers, whether resins or rubbers, such as the alpha-olefin polymers including resinous homopolymers of alpha-olefins (e.g., polyethylene, polypropylene) or the rubbery copolymers of two or more different alpha-olefins (e.g., ethylene-propylene rubber, known as EPM). Also included are resinous or rubbery polymers having a minor amount of unsaturation, such as the alpha-olefin polymers which are rubbery terpolymers of two or more different alpha-olefins with at least one nonconjugated diolefin (e.g., rubbery terpolymers of ethylene, propylene, and dicyclopentadiene, 1,4-hexadiene, methylene norbornene, cyclooctadiene, or the like, known as EPDM); these ordinarily contain less than 25% of olefinic unsaturation (i.e., less than 25% by weight of the diolefin). Similarly, the acrylonitrile-butadiene-styrene polymers (called ABS thermoplastics) may be employed. These are usually either (1) graft copolymers of styrene and acrylonitrile on a polybutadiene rubber spine or on a butadiene-styrene rubber spine (with or without additional separately prepared styrene-acrylonitrile resin), or (2) physical mixtures of styrene-acrylonitrile resin with butadiene-acrylonitrile rubber. The olefinic unsaturation (i.e., butadiene content) of such ABS compositions is frequently less than 40%. Other polymers useful in the invention include the polyamides (nylon), polyesters (e.g., polyethylene terephthalate or copolymers thereof, notably in the form of fibers or films), acetal resins (polymers or copolymers as described for example in Modern Plastics Encyclopedia, 1966, pages 109-113; see also U.S. Patent No. 3,027,352). The present chemicals are useful also as antioxidants for lubricants, whether essentially natural lubricating oil obtained from petroleum, or synthetic lubricants of the type represented by such ester lubricants as alkyl esters of dicarboxylic acids (for example those in which the alkyl group has 6-18 carbon atoms and the dicarboxylic acid has 6-18 carbon atoms) or fatty acid (e.g., $C_8$-$C_{14}$ acids) esters of polyols such as neopentyl glycol, trimethylol propane, pentaerythritol, or the like (see Synthetic Lubricants, by Gunderson et al., Reinhold, 1962).

The present antioxidants are effective in the conventional amounts ordinarily used for protecting substrates from oxidation, usually within the range of from 0.01% to 4% by weight, based on the weight of the substrate.

The presently employed derivatives of diphenylamine and the phenylnaphthylamines are more effective than the parent compounds or the known 4,4'-dialkyldiphenylamines either alone, in combinations, or in combination with dialkyl 3,3'-thiodipropionates (in which the alkyl groups typically contain from 8 to 20 carbon atoms). The relative proportions of the present chemicals and the dialkyl 3,3'-thiodipropionate are not critical and may be in accordance with conventional practice, usually from 0.01% to 4% of the antioxidant chemical and from 4% to 0.01% of the dialkyl 3,3'-thiodipropionate.

The derivatives of the phenylnaphthylamines are discoloring but are effective high temperature antioxidants, and in synthetic lubricants of the ester type produce less sludge than the parent compounds.

The diphenylamine derivatives are less discoloring than those of prior art and surprisingly in the presence of dialkyl 3,3'-thiodipropionates show no discoloration after thermal aging.

The compounds of the invention such as shown in Formula I may be prepared by alkylating the appropriate diphenylamine or phenylnaphthylamine with the appropriate olefin using a suitable acid catalyst such as aluminum chloride, zinc chloride, or acid clay. Where there are two groups of different structure on the diphenylamine nucleus a stepwise alkylation may be carried out. In the compounds which contained a trityl group, triphenylmethyl chloride may be used as the alkylating agent.

The unsymmetrical diphenylamines may be prepared in two ways:

(a) By condensing an appropriately substituted aniline with o-chlorobenzoic acid. The carboxyl group may be removed, when desired, by thermal decarboxylation. The final unsymmetrical product may be obtained by reacting with the appropriate alkylating agent using an acid catalyst.

(b) By alkylating diphenylamine with a vinyl type olefin (i.e., butene-1, octene-1) and separating the predominant 2-alkyldiphenylamine or 2,2'-dialkyldiphenylamine. This product may then be reacted with the appropriate alkylating agent using a typical acid catalyst to obtain the final product.

Since vinyl type olefins such as butene-1 alkylate preferentially in the ortho position of diphenylamine and vinylidene type olefins such as alpha-methylstyrene and 2,4,4-trimethylpentene-1 alkylate preferentially in the para position of diphenylamine, some of the described compounds can be prepared in one step by alkylating with mixtures of olefins, or by sequential alkylation using first one olefin then the other, without isolation of the intermediate.

Although the alkylation reactions occur primarily as described, in any preparation mixtures of ortho and para isomers as well as mono, di and tri alkylated products occur. Furthermore in alkylations such as the reaction of diphenylamine with octene-1 some isomerization of the olefin occurs giving some 2-(alpha-ethylhexyl)diphenylamine as well as the predominant 2-(alphamethylheptyl)-diphenylamine. Since these isomers are difficult to separate, it is a preferred embodiment of the invention to use the reaction mixtures containing primary product and small amounts of the isomeric materials in preparing the antioxidants of the invention.

EXAMPLE I

Preparation of 4,4'-bis(alpha,alpha-dimethylbenzyl)diphenylamine

A mixture of 84.5 g. of diphenylamine, 13 g. of montmorillonite clay (Girdler Catalysts' designation KSF/O) and 100 ml. of benzene was heated to the reflux temperature with stirring. Water was removed from the catalyst by azeotropic distillation of the benzene. Enough benzene was removed to allow the pot temperature to reach 130° C. 124 g. of alpha-methyl styrene was added dropwise during 20 minutes and the mixture was stirred for 4 hours at 130-135° C. The catalyst was removed by filtration, and the filtrate was crystallized by pouring into hexane. 152 g. (75% yield) of product was obtained M.P. 99-100° C. The product was recrystallized twice from hexane, M.P. 101-102° C.

Analysis.—Calculated for $C_{30}H_{31}N$ (percent): C, 88.9; H, 7.65; N, 3.45. Found (percent): C, 88.8; H, 7.72; N, 3.34.

EXAMPLE II

Preparation of 4,4'-bis(alpha-methylbenzylhydryl)diphenylamine

A mixture of 7.6 g. of diphenylamine, 4 g. of montmorillonite clay catalyst (Girdler Catalysts' designation KSF/O) and 150 ml. of toluene was heated to the reflux temperature with stirring. Water was removed by azeotropic distillation and toluene was further removed until the pot temperature reached 130° C. 24.5 g. of 1,1-diphenylethylene was added dropwise during 15 minutes and the reaction mixture was stirred for 5 hours at 135° C. The catalyst was removed by filtration and the product was crystallized from hexane to obtain 21 g. (88%) M.P. 148–159° C. Two recrystallizations from isopropanol gave pure material M.P. 171.0–171.5° C.

*Analysis.*—Calculated for $C_{40}H_{35}N$ (percent): C, 90.7; H, 6.66; N, 2.65. Found (percent): C, 90.7; H, 7.07; N, 2.31.

(The chemicals of Examples I and II are claimed in the above-mentioned application Ser. No. 540,830.)

EXAMPLE III

Preparation of 4-(1,1,3,3-tetramethylbutyl)-4'-triphenylmethyldiphenylamine

A mixture of 169 g. of diphenylamine and 30 g. of anhydrous aluminum chloride was heated to 90° C. with stirring. 112 g. of diisobutylene was added dropwise over a one hour period. An exotherm occurred and the temperature was maintained at 115° C. during the addition. The mixture was heated at 125–135° C. for an additional hour, then cooled and poured into water. 400 ml. of benzene was added and the organic layer was separated, washed and dried. The benzene was removed by distillation and the residue product was fractionally distilled under reduced pressure. The fraction boiling at 160–175° C. (0.5 mm.) was the 4-(1,1,3,3-tetramethylbutyl) diphenylamine.

A mixture of 28.1 g. of 4-(1,1,3,3-tetramethylbutyl) diphenylamine, 27.9 g. of triphenylmethyl chloride, 500 ml. of acetic acid and 50 ml. of concentrated hydrochloric acid was heated under reflux. 25 ml. of acetic acid-water mixture was removed by distillation during the first hour, then the mixture was refluxed an additional 2½ hours. The reaction mixture was poured into water and the resulting solid was removed by filtration. The solid was slurried with benzene and heated under reflux, then filtered hot to remove any insoluble material. The filtrate was evaporated to dryness and the crude product (27 g.) recrystallized three times from hexane, M.P. 203–205° C.

*Analysis.*—Calculated for $C_{39}H_{41}N$ (percent): C, 89.5; H, 7.84; N, 2.68. Found (percent): C, 89.7; H, 7.86; N, 2.85.

EXAMPLE IV

Preparation of 2,4,4'-tris(alpha,alpha-dimethylbenzyl)diphenylamine

A mixture of 169 g. of diphenylamine, 25 g. of montmorillonite clay (Girdler Catalysts' designation KSF/O) previously dried at 120° C. for 16 hours, and 150 ml. of toluene was heated with stirring to 130° C. 220 g. of p,alpha-dimethylstyrene was added over a one hour period and the reaction was maintained at 135° C. for four hours. The catalysts was removed by filtration and the product was crystallized from hexane, M.P. 102–103° C.

*Analysis.*—Calculated for $C_{32}H_{35}N$ (percent): C, 88.7; H, 8.08; N, 3.23. Found (percent): C, 88.6; H, 7.89; N, 3.21.

EXAMPLE V

Preparation of 2,4,4'-tris(alpha,alpha-dimethyl benzyl)diphenylamine

A mixture of 85 g. of diphenylamine, 13.3 g. of anhydrous aluminum chloride, and 200 ml. of n-hexane was heated at the reflux temperature with stirring. 206 g. of alpha-methyl styrene was added dropwise during 1½ hours, and the mixture was stirred at 80–85° C. for 4½ hours. The reaction mixture was cooled and poured into water, the organic layer separated and washed three times with water, and the solvent was removed by distillation. The product was vacuum topped to 200° C. (0.5 mm.). Crystallization of the crude product (216 g.) from hexane removed most of the more insoluble 4,4'-bis(alpha,alpha-dimethylbenzyl)diphenylamine. The filtrate was evaporated to dryness and the residue product (145 g.) recrystallized twice from isopropanol to obtain 49 g., M.P. 114–116° C. An analytical sample was prepared by chromatographing 10 g. of the compound on 250 g. of alumina using 20% benzene-80% hexane as the eluent. The first fractions obtained were evaporated and recrystallized twice from hexane, M.P. 121.5–122.5° C.

*Analysis.*—Calculated for $C_{39}H_{41}N$ (percent): C, 89.5; H, 7.84; N, 2.68. Mol. wt. 523. Found (percent): C, 89.5; H, 7.86; N, 2.63. Mol. wt. 531.

EXAMPLE VI

Preparation of 2,2'-dibromo-4,4'-bis(alpha,alpha-dimethylbenzyl)diphenylamine

To a stirred solution of 40 g. of 4,4'-bis(alpha,alpha-dimethylbenzyl)diphenylamine in 300 ml. of glacial acetic acid was added 32 g. of bromine dissolved in 100 ml. of glacial acetic acid at room temperature. After the addition was complete the mixture was heated at 45° C. for ten minutes and the product was removed by filtration. The crude dibromo derivative was dissolved in benzene and the solution extracted with dilute sodium hydroxide, then washed with water. The benzene was evaporated and the product was recrystallized from isopropanol to obtain 39 g., M.P. 166–167° C.

*Analysis.*—Calculated for $C_{30}H_{29}Br_2N$ (percent): C, 63.9; H, 5.15; N, 2.49; Br, 28.4. Found (percent): C, 63.5; H, 5.20; N, 2.77; Br, 28.1.

EXAMPLE VII

Preparation of 4,4'-bis(alpha,alpha-dimethylbenzyl)-2-carboxydiphenylamine 187 g. of N-phenylanthranilic acid, prepared according to Org. Syn. Coll., vol. II, p. 15, was dissolved in 500 ml. of a solution containing 50 g. of potassium hydroxide. The insoluble material was removed by filtration. To the aqueous solution was added an aqueous solution containing 71 g. of zinc sulfate. The zinc N-phenylanthranilate was separated by filtration and dried.

A mixture of 110 g. of zinc N-phenylanthranilate, 30 g. of zinc chloride and 500 ml. of 1,2-dichloroethane was heated under reflux with stirring. 118 g. of alpha-methyl styrene was added dropwise over a twenty minute period and the mixture heated under reflux for six hours. The reaction mixture was poured into water and chloroform added. The organic layer was separated and washed with dilute hydrochloric acid, then with water. The solvent was removed by distillation and the product recrystallized from isopropanol to obtain 88 g. of product, M.P. 197–199° C. Further recrystallization gave material which melted 198–199° C.

*Analysis.*—Calculated for $C_{31}H_{31}NO_2$ (percent): C, 82.9; H, 6.90; N, 3.12. Found (percent): C, 83.0; H, 7.22; N, 3.32.

EXAMPLE VIII

Preparation of nickel 4,4'-bis(alpha,alpha-dimethylbenzyl)diphenylamine-2-carboxylate 4.5 g. of 4,4'-bis(alpha,alpha-dimethylbenzyl)-2-carboxydiphenylamine was dissolved in 100 ml. of 0.01 N sodium hydroxide. 30 ml. of ethanol was added to aid solution and the solution was filtered to remove any undissolved material. 1.44 g. of nickel sulfate dissolved in 50 ml. of water was added to this solution with stirring and the resulting precipitated nickel salt was filtered and dried at 50° C.

EXAMPLE IX

Preparation of 2-sec-butyl-4,4'-bis(alpha,alpha-dimethylbenzyl)-diphenylamine

A mixture of 169 g. of diphenylamine, 73 g. of butene-1 and 25 g. of montmorillonite clay (Girdler Catalysts' designation KSF/O) was heated for 5 hours at 175° C. in a one liter stirred autoclave. The catalyst was removed by filtration and the residue combined with a second reaction mixture obtained under similar reaction conditions. The crude mixture was purified by fractional distillation under reduced pressure. The fraction boiling at 136–137° C. (1.4 mm.) was 2-sec-butyldiphenylamine.

A mixture of 66 g. of 2-sec-butyldiphenylamine, 10 g. of montmorillonite clay (Girdler Catalysts' KSF/O), and 30 ml. of toluene was heated with stirring to 130° C. 76.5 g. of alpha-methylstyrene was added over a ½ hour period and the reaction temperature was maintained at 130–135° C. for five hours. The catalyst was removed by filtration, and the solvent was removed by distillation. The viscous residue product was fractionally distilled under reduced pressure. The fraction boiling at 240° C. (0.25 mm.) was the 2-sec-butyl-4,4'-bis(alpha,alpha-dimethylbenzyl)diphenylamine.

*Analysis.*—Calculated for $C_{34}H_{39}N$ (percent): C, 88.5; H, 8.46; N, 3.04. Found (percent): C, 88.6; H, 8.28; N, 2.87.

EXAMPLE X

Preparation of 4,4'-bis(alpha,alpha-dimethylbenzyl)-2-(alpha-methylheptyl)diphenylamine A mixture of 592 g. of diphenylamine, 471 g. of octene-1 and 59 g. of montmorillonite clay (Girdler Catalysts' designation KSF/O), previously dried at 120° C. for 3 hours, was heated at 175° C. for six hours in a 2-liter Magne-Dash autoclave. The catalyst was removed by filtration and the crude product subjected to fractional distillation. The fraction boiling at 150–170° C. (0.2 mm.) weighed 395 g. and assayed 85% 2-(alpha-methylheptyl)diphenylamine.

A mixture of 56 g. of 2-(alpha-methylheptyl)diphenylamine, 8.5 g. of montmorillonite clay (Girdler Catalysts' designation KSF/O), previously dried at 120° C. for 16 hours, and 50 ml. of toluene was heated to 130° C. with stirring. 52 g. of alpha-methylstyrene was added during a twenty minute period and the stirred mixture was maintained at 130° C. for four hours. The catalyst was removed by filtration and the crude product was fractionally distilled under reduced pressure. The fraction distilling at 280° C. (0.5 mm.) was the desired product.

*Analysis.*—Calculated for $C_{38}H_{47}N$ (percent): C, 88.2; H, 9.09; N, 2.71. Found (percent): C, 88.2; H, 9.05; N, 3.00.

EXAMPLE XI

Preparation of 2-(alpha-methylpentyl)-4,4'-dityldiphenylamine

A mixture of 25.3 g. of 2-(alpha-methylpentyl)diphenylamine, 58.5 g. of trityl chloride, 2.5 g. of aluminum chloride and 50 ml. of benzene was heated under reflux for 3½ hours. 10 ml. of ethyl ether was added after cooling and the mixture was then poured into water. The aqueous layer was removed and the organic layer was poured into an equal volume of hexane. The resulting precipitate 78 g. was filtered. A pure sample was obtained by chromatography on alumina using benzene as the eluent followed by recrystallization from a 1:1 benzene-isopropanol mixture. The sample was dried under vacuum at 78° C. for 8 hours, M.P. 220.5–221.5° C.

*Analysis.*—Calculated for $C_{56}H_{51}N$ (percent): C, 91.2; H, 6.92; N, 1.90. Found (percent): C, 91.3; H, 7.38; N, 1.73.

EXAMPLE XII

Preparation of 4-(alpha,alpha-dimethylbenzyl)-4'-isopropoxydiphenylamine

A mixture of 56.8 g. of isopropoxydiphenylamine, 5 g. of anhydrous aluminum chloride and 100 ml. of n-hexane was heated at the reflux temperature with stirring. 30.7 g. of alpha-methylstyrene was added dropwise and after the addition was completed the mixture was heated an additional four hours at 70–75° C. The reaction mixture was poured into water and benzene was added to facilitate separation. The benzene layer was washed with dilute sodium hydroxide, then water, and dried over sodium sulfate. The benzene was removed by distillation and the crude product was fractionally distilled. 51 g. of product was obtained: B.P. 211–216° C. (0.3 mm.).

*Analysis.*—Calculated for $C_{24}H_{27}NO$ (percent): C, 83.4; H, 7.88; N, 4.05. Found (percent): C, 83.1; H, 8.35; N, 4.08.

EXAMPLE XIII

Preparation of 2-(alpha-methylheptyl)-4'-(alpha,alpha-dimethylbenzyl)diphenylamine A mixture of 39.5 g. of 2-(alpha-methylheptyl)diphenylamine and 6 g. of montmorillonite clay (Girdler Catalysts' designation KSF/O) was heated to 125° C. and 20 g. of alpha-methylstyrene was added over a ten minute period. The mixture was heated at 120–130° C. for four hours. The reaction mixture was diluted with benzene and the catalyst was removed by filtration. The solvent was removed by distillation and the residue product was purified by fractional distillation under reduced pressure. The fraction boiling at 220° C. (0.4 mm.) was the desired product.

*Analysis.*—Calculated for $C_{39}H_{37}N$ (percent): C, 87.2; H, 9.27; N, 3.51. Found (percent): C, 87.1; H, 9.22; N, 3.82.

EXAMPLE XIV

Preparation of 2-(alpha-methylpentyl)-4'-trityldiphenylamine

A mixture of 846 g. of diphenylamine, 547 g. of hexene-1 and 85 g. of montmorillonite clay (Girdler Catalysts' designation KSF/O) was heated in a one gallon stirred autoclave for 6 hours at 225° C. The reaction mixture was diluted with toluene and the catalyst removed by filtration. The solvent and excess hexene-1 were removed by distillation and the crude product was purified by fractional distillation through a 10 inch column packed with Berl saddles. The fraction boiling at 117–121° C. (0.1 mm.) was 2-(alpha-methylpentyl)diphenylamine.

A mixture of 50.6 g. of 2-(alpha-methylpentyl)diphenylamine, 27.9 g. of trityl chloride, 5 g. of anhydrous aluminum chloride and 150 ml. of benzene was heated at the reflux temperature for three hours. The reaction mixture was poured into water and the organic layer separated and washed four times with water. The solvent was removed by distillation and the unreacted starting material removed by distillation under reduced pressure, B.P. 123° C. (0.3 mm.). The residue product was chromatographed on alumina using 20% benzene-80% hexane as the eluent. The product thus obtained was recrystallized twice from hexane to obtain the desired product: M.P. 67–71° C.

*Analysis.*—Calculated for $C_{37}H_{37}N$ (percent): C, 89.7; H, 7.48; N, 2.83. Found (percent): C, 89.8; H, 7.40; N, 3.07.

EXAMPLE XV

Preparation of N-(4-alpha,alpha-dimethylbenzylphenyl)-1-naphthylamine

A mixture of 219 g. of N-phenyl-1-naphthylamine, 25 g. of montmorillonite clay (Girdler Catalysts' designation KSF/O) and 300 ml. of toluene was heated to the reflux temperature and 100 ml. of toluene was distilled from the mixture. The reaction mixture was maintained at 130° C. and 260 g. of alpha-methylstyrene was added dropwise over a one hour period. The mixture was heated an additional four hours at 135° C. The catalyst was removed by filtration and the product vacuum topped to 200° C. (1.0 mm.). The crude product was purified by chromatography on alumina using benzene-hexane mixtures as the eluent, followed by two recrystallizations from hexane. The pure product after drying under vacuum at 78° C. for six hours melted at 91.5–92.5° C.

*Analysis.*—Calculated for $C_{25}H_{23}N$ (percent): C, 89.0; H, 6.87; N, 4.15. Found (percent): C, 89.0; H, 7.06; N, 4.04.

EXAMPLE XVI

Preparation of N-(4-alpha,alpha-dimethylbenzylphenyl)-1-(alpha,alpha-dimethylbenzyl)-2-naphthylamine A mixture of 219 g. of N-phenyl-2-naphthylamine, 30 g. of anhydrous aluminum chloride, and 250 ml. of benzene was heated with stirring to 70–75° C. 260 g. of alpha-methylstyrene was added dropwise during a one hour period and the reaction mixture was maintained at 70–85° C. for four hours. The mixture was poured into water, more benzene was added and the benzene solution was washed twice with water. The benzene was removed by distillation and the crude product vacuum topped at 200° C. (0.4 mm.). 394 g. of residue product was obtained. A pure product (M.P. 121.5–122.0° C.) was obtained by two recrystallizations from a benzene-hexane mixture.

*Analysis.*—Calculated for $C_{34}H_{33}N$ (percent): C, 89.6; H, 7.30; N, 3.08. Mol. wt. 456. Found (percent): C, 89.8; H, 7.49; N, 3.12. Mol. wt. 471.

EXAMPLE XVII

Preparation of N-(4-alpha,alpha-dimethylbenzylphenyl)-2-naphthylamine

A mixture of 110 g. of N-phenyl-2-naphthylamine, 12.5 g. of montmorillonite clay (Girdler Catalysts' designation KSF/O) and 150 ml. of toluene was heated at the reflux temperature with stirirng. Water was removed from the catalyst by azeotropic distillation along with 100 ml. of toluene. 65 g. of alpha-methylstyrene was added dropwise over a ½ hour period and the reaction mixture was maintained at 100° C. for two hours. The catalyst was removed by filtration and the solvent removed by distillation. The product was crystallized from hexane and after two recrystallizations from hexane melted at 92.0–92.5° C.

*Analysis.*—Calculated for $C_{25}H_{23}N$ (percent): C, 89.0; H, 6.87; N, 4.15. Found (percent): C, 88.6; H, 7.07; N, 3.85.

EXAMPLE XVIII

In this example the compounds of the invention were tested as stabilizers for polyacetal resins against thermal degradation.

The solid stabilizers were incorporated into unstabilized acetal copolymer resin based on trioxane ("Celcon CKX–205," see Modern Plastics Plastics Encyclopedia, 1966, page 111, or U.S. Patent No. 3,027,352), by dry blending for five minutes using a Waring Blendor. Liquid stabilizers were incorporated by dissolving in a suitable solvent, slurrying with the resin and steaming under vacuum to remove the solvent. Five grams of the powdered resin containing 0.5% by weight of the stabilizer was placed in an open aluminum cup and exposed in a 230° C. oven for 45 minutes, and the loss in weight of the polymer was determined.

TABLE I

| Compound: | Percent weight loss |
|---|---|
| Control | 31.9 |
| 4,4'-bis(alpha,alpha-dimethylbenzyl)diphenylamine | 0.92 |
| 4,4'-(alpha-methylbenzhydryl)diphenylamine | 0.94 |
| 4-(1,1,3,3-tetramethylbutyl)-4'-triphenylmethyldiphenylamine | 0.84 |
| N-(4-alpha,alpha-dimethylbenzylphenyl)-2-naphthylamine | 0.74 |
| N-(4-alpha,alpha-dimethylbenzylphenyl)-1-naphthylamine | 0.86 |
| 4,4'-butylidene bis(6-tert.-butyl-mercresol) ("Santowhite Powder") | 2.24 |

EXAMPLE XIX

This example demonstrates the usefulness of the compounds of the invention as processing stabilizers for terpolymers composed of ethylene, propylene, and a small amount of nonconjugated diene.

Two percent by weight of the stabilizer was incorporated into unstabilized rubbery terpolymer, containing for example about 62% ethylene, 33% propylene and 5% dicyclopentadiene, on a mill at 150° F. and the mixture subjected to milling at 300° F. After various milling times the Mooney viscosity (ML–4 at 212° F.) of the polymer was measured. A rise in viscosity is indicative of degenerative cross-linking of the polymer due to heat and mechanical shearing.

TABLE II

| Compound | Mooney Viscosity vs. Time on 300° F. Mill | | | | |
|---|---|---|---|---|---|
| | 0'' | 15'' | 30' | 45'' | 60'' |
| Control | 53 | 57 | 74 | 90 | 97 |
| 4,4'-bis(alpha,alpha,dimethylbenzyl)diphenylamine | 52 | 51 | 51 | 50 | 50.5 |
| 2,2'-dibromo-4,4'-bis(alpha,alpha,dimethylbenzyl)diphenylamine | 53 | 52.5 | 51 | 50.5 | 59 |
| 2,4,4'-tris(alpha,alpha-dimethylbenzyl)diphenylamine | 54 | 51 | 49.5 | 49 | 53 |
| 4,4'-bis(alpha-methylbenzhydryl)-diphenylamine | 52.5 | 52 | 52.5 | 55 | 50 |
| N-(4-alpha,alpha-dimethyl-benzylphenyl)-1-naphthylamine | 52 | 51.5 | 52 | 52 | 54 |

EXAMPLE XX

This example demonstrates the usefulness of the compounds of the invention as stabilizers for synthetic lubricants of the ester type.

To 300 ml. of a synthetic lubricant, namely, di(2-ethylhexyl)sebacate ("Plexol 201–J"), is added 5.40 g. (2% by weight of the antioxidant. The mixture is warmed and agitated to facilitate solution. When a homogeneous solution is obtained a 15 ml. sample is withdrawn and the neutralization value (ASTM D974–58T) is determined. The Saybolt viscosity is determined on a standard Saybolt viscometer. A 250 ml. sample is placed in a 750 ml. test tube with an open end formed as a ground glass joint. A copper washer and iron washer are polished with fine emery cloth, washed with acetone and placed on an air delivery tube having a lip to support the washers 6 mm. from the lower end of the tube which is beveled to allow free air flow. The air tube and washers are inserted in the test tube containing the oil sample to which an Allihn type ground glas joint condenser is connected. The assembly is placed in the well of an aluminum heating block maintained at 400° F. The flow of cooling water is started through the condenser and a source of clean dry air is connected to the air tube and allowed to flow uninterrupted for 72 hours at a rate of 12.5 liters/hour.

At the end of 72 hours the oil is allowed to come to room temperature and the oil loss determined. The oil sample is filtered, and the Saybolt viscosity, neutralization value (ASTM D974-58T) and the amount of sludge are determined.

meters thick. Three plates of each sample of stabilized polymer were aged at 300° F. in a circulating air oven.

TABLE III

| Compound | Viscosity at 210° F. Saybolt Universal Seconds | | Neutralization Number | | Oil loss after 72 hours | Sludge |
|---|---|---|---|---|---|---|
| | 0 hours | 72 hours | 0 hours | 72 hours | | |
| (1) 4,4'-bis(alpha,alpha-dimethylbenzyl)-diphenylamine | 38 | 39.2 | 0.19 | 16.1 | 5.2 | Medium. |
| (2) 4,4'-bis(alpha-methylbenzhydryl)-diphenylamine | 38 | 40.2 | 0.28 | 19.7 | 6.1 | Heavy. |
| (3) 4-(1,1,3,3-tetramethylbutyl)-4'-trityldiphenylamine | 38 | 40.6 | 0.22 | 17.2 | 3.5 | Light. |
| (4) 2-(alpha-methylheptyl)-4,4'-bis(alpha,alpha-dimethylbenzyl)diphenylamine | 38 | 41.0 | 0 | 23.3 | 3.5 | Do. |
| (5) 2-alpha-methylheptyl)-4-(alpha,alpha-dimethylbenzyl)diphenylamine | 38 | 39.5 | 0.16 | 22.6 | 6.9 | Do. |
| (6) N-(4-alpha,alpha-dimethylbenzylphenyl)-1-naphthylamine | 38 | 39.6 | 0.44 | 12.5 | 6.1 | Medium. |
| (7) N-4-alpha,alpha-dimethylbenzylphenyl)-2-naphthylamine | 38 | 39.8 | 0.49 | 16.2 | 5.2 | Heavy. |
| (8) N-(4-alpha-dimethylbenzylphenyl)1-(alpha,alpha-dimethylbenzyl)-2-naphthyl-amine | 38 | 39.8 | 0.29 | 14.0 | 5.2 | Do. |
| Control | 38 | 43.2 | 0.25 | 32.2 | 5.2 | Trace. |

EXAMPLE XXI

This example demonstrates the usefulness of the compounds of the invention as stabilizers for polyethylene.

The stabilizers (0.1% by weight) were milled into unstabilized polyethylene (DYNH) at 310° F. for 5-7 minutes. The polymer was then extruded into plates, 75 millimeters thick. The plates were aged at 375° F. and the time to resinification determined.

TABLE IV

| Compound | Minutes to resinification (375° F.) |
|---|---|
| (1) Control (unstabilized) | 120 |
| (2) 4-(1,3,3-tetramethylbutyl)-4'-triphenylmethyldiphenylamine | 150 |
| (3) 4,4'-bis(alpha-methylbenzhydryl)-diphenylamine | 180 |
| (4) 2,4,4'-tris(alpha, alpha-dimeth, l-benzyl(diphenylamine | 180 |
| (5) 4,4'-bis(alpha, aplha-dimethylbenzyl)-diphenylamine | 270 |

The break point was defined as the first sign of embrittlement or crumbling in two out of the three pieces.

Table V illustrates the synergism obtained with diphenylamine derivatives of the invention with dilauryl 3,3'-thiodipropionate both in stabilization and color and indicates their superiority over chemicals of prior art.

TABLE V

| Compound | (Conc.) | Days to break at 300° F. | Initial color | Color break |
|---|---|---|---|---|
| (1) 4,4'-bis(alpha,alpha-dimethylbenzyl)diphenylamine | (0.3%) | 6 | White | Yellow. |
| (2) 4,4'-bis(1,1,3,3-tetramethylbutyl)diphenylamine [1] | (0.3%) | 2 | do | Do. |
| (3) Dilauryl 3,3'-thiodipropionate | (0.4%) | 10 | do | White. |
| (4) 4,4'-bis(alpha,alpha-dimethylbenzyl)diphenylamine / Dilauryl 3,3'-thiodipropionate | (0.1%) / (0.4%) | 37 | do | Do. |
| (5) 4,4'-bis(1,1,3,3-tetramethylbutyl)diphenylamine / Dilauryl 3,3'-thiodipropionate [1] | (0.1%) / (0.4%) | 20 | do | Do. |
| (6) 2,4,4'-tris(alpha,alpha-dimethylbenzyl)diphenylamine / Dilauyl 3,3'-thiodipropionate | (0.1%) / (0.4%) | 30 | do | Do. |
| (7) 4-(1,3,3-tetramethylbutyl)-4'-trityldiphenylamine / Dilauryl 3,3'-thiodipropionate | (0.1%) / (0.4%) | 48 | do | Yellow. |
| (8) Nickel 4,4'-bis(alpha,alpha-dimethylbenzyl)amine,-2-carboxylate / Dilauryl 3,3'-thiodipropionate | (0.1%) / (0.4%) | 62 | Off-white | Off-white. |

[1] Prior art.

Table VI is a further illustration of the synergism between the diphenylamine derivatives of the invention and dilauryl 3,3'-thiodipropionate.

TABLE VI

| Compound | (Conc.) | Days to break at 300° F. | Initial color | Color at break |
|---|---|---|---|---|
| (1) Dilauryl 3,3'-thiodipropionate | (0.4%) | 20 | White | Off-white. |
| (2) 4,4'-bis(alpha,alpha-dimethylbenzyl)diphenylamine / Dilauryl 3,3'-thiodipropionate | (0.1%) / (0.4%) | 44 | do | Do. |
| (3) 2,4,4'-tris(alpha,alpha-dimethylbenzyl)diphenylamine / Dilauryl 3,3'-thiodipropionate | (0.1%) / (0.4%) | 41 | do | White. |
| (4) 4,4'-bis(alpha,alpha-dimethylbenzyl)-2-carboxydiphenylamine / Dilauryl 3,3'-thiodipropionate | (0.1%) / (0.4%) | 41 | Yellow | Yellow. |
| (5) 4-(alpha,alpha-dimethylbenzyl)-4'-isopropoxydiphenylamine / Dilauryl 3,3'-thiodipropionate | (0.1%) / (0.4%) | 31 | Orange | White. |

EXAMPLE XXII

This example demonstrates the usefulness of the compounds of the invention as stabilizers for polypropylene in combination with dilauryl thiodipropionate. The stabilizers were incorporated into the polypropylene (unstabilized "Profax 6501") by first milling the resin at 340° F. for several minutes, then adding the stabilizers to the polymer. The milling was continued for 8-10 minutes. The polymer was then molded into plates 90 milli- Table VII illustrates the effectiveness of the phenylnaphthylamine derivatives of the invention as stabilizers for polypropylene, their synergism with dilauryl 3,3'-thiodipropionate and their superiority over chemicals of prior art.

TABLE VII

| Compound | (Conc.) | Days to break at 300° F. | Initial color | Color at break |
|---|---|---|---|---|
| (1) N-phenyl 1-naphthylamine¹ | (0.1%) | 1 | White | Yellow. |
| Do | (0.3%) | 1 | Buff | Dark yellow. |
| (2) N-phenyl 2-naphthylamine¹ | (0.1%) | 1 | Off-white | Yellow. |
| Do | (0.3%) | 1 | Pink | Dark yellow. |
| (3) N-(4-alpha,alpha-dimethylbenzylphenyl)-1-naphthylamine | (0.1%) | 2 | White | Tan. |
|  | (0.3%) | 19 | Tan | Tan. |
| (4) N-(4-alpha,alpha-dimethylbenzylphenyl)-2-naphthylamine | (0.1%) | 2 | Off-white | Tan. |
|  | (0.3%) | 16 | Light pink | Tan. |
| (5) N-(4-alpha,alpha-dimethylbenzylphenyl)-1-naphthylamine | (0.1%) | 32 | White | Off-white. |
| Dilauryl 3,3'-thiodipropionate | (0.4%) | | | |
| (6) N-phenyl-1-naphthylamine¹ | (0.1%) | 12 | do | White. |
| Dilauryl 3,3'-thiodipropionate | (0.4%) | | | |
| (7) N-phenyl-2-naphthylamine¹ | (0.1%) | 16 | Off-white | Off-white. |
| Dilauryl 3,3'-thiodipropionate | (0.4%) | | | |
| (8) N-(4-alpha,alpha-dimethylbenzylphenyl)-2-naphthylamine | (0.1%) | 24 | White | Do. |
| Dilauryl 3,3'-thiodipropionate | (0.4%) | | | |

¹ Prior art.

EXAMPLE XXIII

This example demonstrates the usefulness of the compounds of the invention in combination with dilauryl 3,3'-thiodipropionate as thermal stabilizers for acrylonitrile-butadiene-styrene thermoplastics.

A 91.1% dispersion of a commercial ABS thermoplastic was made with chloroform as the dispersing agent. The ABS used in all studies contains approximately 56.5% styrene, 23.5% acrylonitrile, and 20.0% butadiene prepared by the method of Childers and Fisk, U.S. Patent No. 2,820,773. Antioxidants were dissolved in chloroform and the proper amount added to the ABS homogeneous dispersion.

Films were prepared on salt plates by evaporation of smears of the dispersions. The films were aged at 400° F. in a circulating air oven and the infrared spectrum examined at specified time intervals. The optical density of the 5.85µ carbonyl band was plotted against time in minutes. The oxidative life of the polymer containing the antioxidants was defined by a large increase in the slope of the plot. Table VIII illustrates the effectiveness of the chemical combinations when compared to a commercial phenolic system.

Having thus described my invention, what I claim and desire to protect by Letters Patent is:

1. A composition consisting essentially of a major amount of a substrate selected from the group consisting of alpha-olefin polymers containing less than 25% of olefinic unsaturation, thermoplastic acrylonitrile-butadiene-styrene polymers containing less than 40% of olefinic unsaturation, polyamides, polyesters, acetal resins, and lubricating oils, containing in intimate admixture, as an antioxidant, a stabilizing amount of 4,4'-bis(alpha,alpha-dimethylbenzyl)diphenylamine.

2. A composition consisting essentially of a major amount of a substrate selected from the group consisting of alpha-olefin polymers containing less than 25% of olefinic unsaturation, thermoplastic acrylonitrile-butadiene-styrene polymers containing less than 40% of olefinic unsaturation, polyamides, polyesters, acetal resins, and lubricating oils, containing in intimate admixture, as an antioxidant, a stabilizing amount of 4,4'-bis(alpha,alpha-dimethylbenzyl)diphenylamine, and a dialkyl 3,3'-thiodipropionate.

TABLE VIII

| Compound | Concentration, percent by weight | Oxidative life at 400° F. (minutes) |
|---|---|---|
| (1) 4,4'-bis(alpha,alpha-dimethylbenzyl)diphenylamine | (0.5%) | 135 |
| Dilauryl 3,3'-thiodipropionate | (0.5%) | |
| (2) 2-(alpha,methylheptyl)-4,4'-bis(alpha,alpha-dimethylbenzyl)diphenylamine | (0.5%) | 135 |
| Dilauryl 3,3'-thiodipropionate | (0.5%) | |
| (3) 4,4'-bis(alpha-methylbenzhydryl)diphenylamine | (0.5%) | 150 |
| Dilauryl 3,3'-thiodipropionate | (0.5%) | |
| (4) 4-(1,1,3,3-tetramethylbutyl)-4'-trityldiphenylamine | (0.5%) | 150 |
| Dilauryl 3,3'-thiodipropionate | (0.5%) | |
| (5) 4,4'-bis(alpha,alpha-dimethylbenzyl)diphenylamine | (0.7%) | 190 |
| Dilauryl 3,3'-thiodipropionate | (0.7%) | |
| (6) Methylene bis-(4-methyl-6-nonyl)phenol ("Naugawhite") | (0.25%) | 75 |
| Dilauryl 3,3'-thiodipropionate | (0.70%) | |

References Cited

UNITED STATES PATENTS

| | | | |
|---|---|---|---|
| 2,530,769 | 11/1950 | Hollis | 252—50 X |
| 2,943,112 | 6/1960 | Popoff et al. | 252—401 X |
| 3,004,916 | 10/1961 | Ertelt | 252—50 X |
| 3,072,603 | 1/1963 | Tholstrup | 260—576 X |
| 3,346,496 | 10/1967 | Neumann et al. | 252—50 |

DANIEL E. WYMAN, Primary Examiner

W. H. CANNON, Assistant Examiner

U.S. Cl. X.R.

252—47.5, 50, 401, 402; 260—45.9, 45.85, 429, 429.7, 429.9, 518, 576